F. F. ALEXANDER & L. W. BRUUN.
POTATO DIGGER.
APPLICATION FILED JUNE 6, 1917.
1,266,376.
Patented May 14, 1918.
2 SHEETS—SHEET 1.
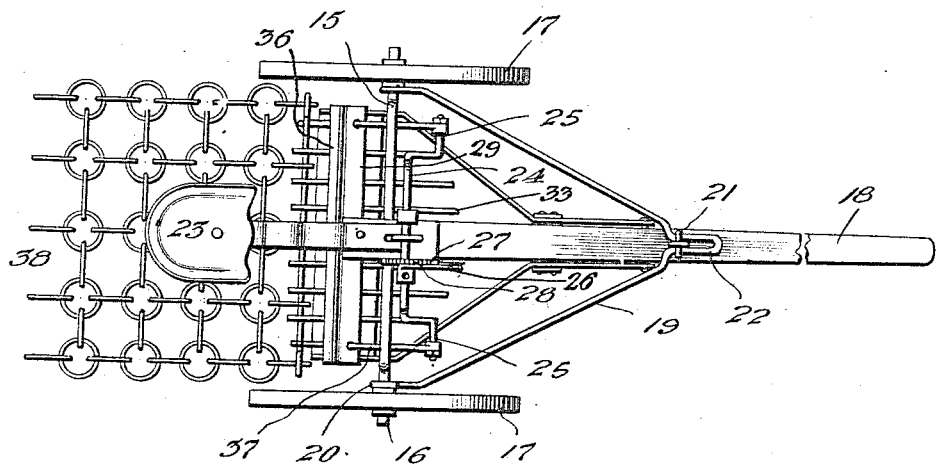
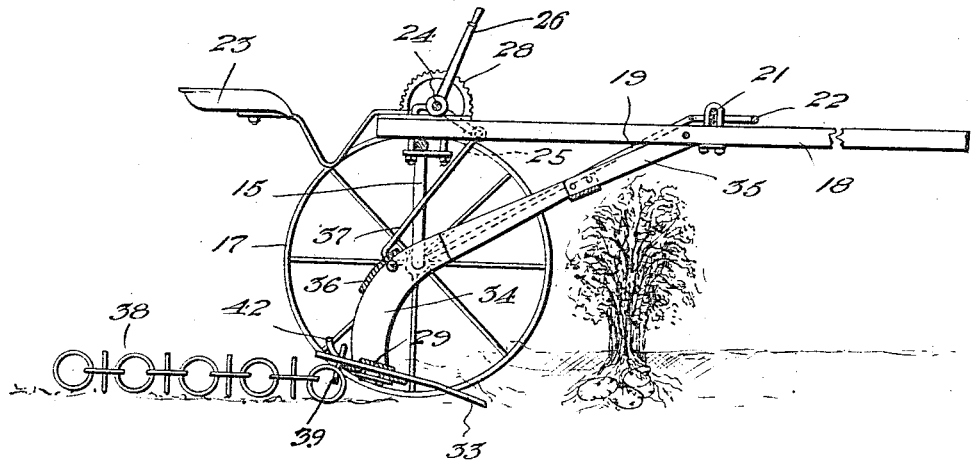
WITNESSES
Paul M. Hunt
Eva W. Springer
INVENTORS
Frank F. Alexander
Louis W. Bruun
BY Victor J. Evans
ATTORNEY

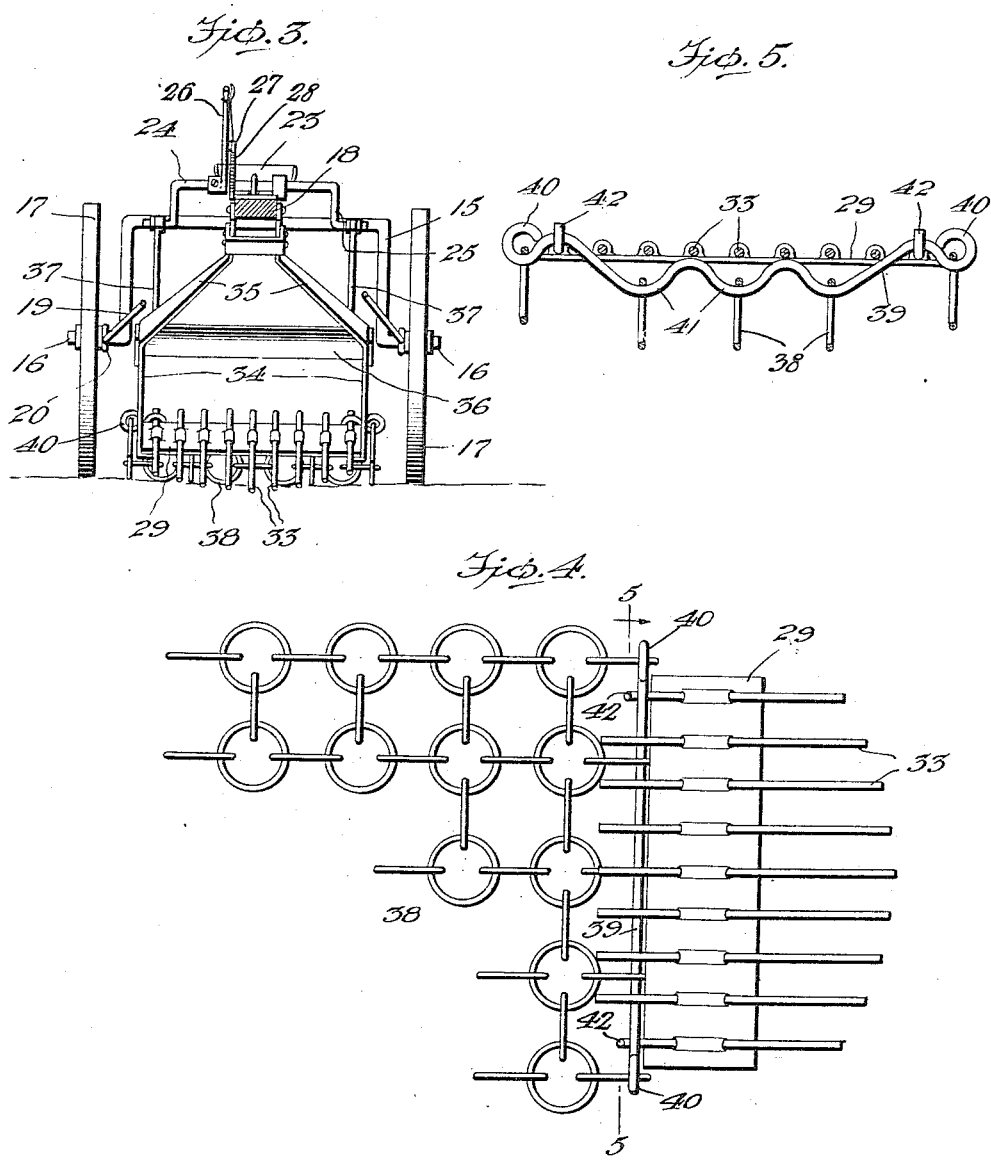

UNITED STATES PATENT OFFICE.

FRANK F. ALEXANDER AND LOUIS W. BRUUN, OF INTERNATIONAL FALLS, MINNESOTA.

POTATO-DIGGER.

1,266,376.    Specification of Letters Patent.    Patented May 14, 1918.

Application filed June 6, 1917. Serial No. 173,251.

*To all whom it may concern:*

Be it known that we, FRANK F. ALEXANDER and LOUIS W. BRUUN, citizens of the United States, residing at International Falls, in the county of Koochiching and State of Minnesota, have invented new and useful Improvements in Potato-Diggers, of which the following is a specification.

This invention relates to potato diggers and it has for its object to produce a simple, improved and efficient machine for digging potatoes from the ground and for cleaning the same from adhering dirt, leaving the potatoes exposed on the surface of the ground for subsequent gathering.

A further object of the invention is to simplify and improve that part of the machine which constitutes the digger whereby the potatoes are excavated and lifted from the ground.

A further object of the invention consists in the combination with the digger of a cleaning device consisting of a flexible mat of peculiar and improved construction.

A further object of the invention is to simplify and improve the manner of connecting the flexible mat with the digger.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a top plan view of a machine constructed in accordance with the invention.

Fig. 2 is a longitudinal sectional view of the same.

Fig. 3 is a front elevation, the tongue being shown in section.

Fig. 4 is a top plan view of the digger element and the mat connected therewith.

Fig. 5 is a transverse sectional view taken on the line 5—5 in Fig. 4 to show the manner of connecting the mat with the digger element.

Corresponding parts in the several figures of the drawings are denoted by like characters of reference.

The frame of the improved machine comprises an arched axle 15 having spindles 16 on which ground wheels 17 are mounted for rotation. The frame also includes a tongue 18 connected at its rearward end with the axle arch. 19 is a yoke the limbs of which are provided with terminal eyes 20 engaging the spindles 16; the forward end of the yoke rests on the tongue and is connected therewith by a bolt or fastening member 21. The yoke also has a forward extension 22 which may be utilized as a draft clevis. The seat 23 is mounted on the rearward end of the tongue which also supports a rock shaft 24 having downwardly extending arms or cranks 25 and an upwardly extending lever 26, the lever being equipped with a locking device 27 adapted to engage a rack segment 28 for the purpose of securing the lever and related parts in position at various adjustments.

The digger or digging element proper includes a blade or plate 29 which may be of substantially rectangular shape or of any other convenient form, said plate being provided with a plurality of teeth 33, said teeth being lengthwise disposed in substantially parallel relation to each other. The teeth may be secured on the plate by welding or in any other convenient manner. The teeth are preferably of unequal length, the longest teeth being disposed centrally of the plate from which point the length of the teeth is decreased toward the ends, the teeth being, however, so arranged that their rearward ends will be disposed substantially in a straight line. It follows that the points or front ends of the teeth will be arranged in approximate V-shape, as clearly seen in the drawings. The plate 29 is securely connected with and carried by standards 34 that extend downwardly at the rearward ends of a pair of beams 35, said beams converging in a forward direction and said beams being pivotally connected with the tongue 18. The beams 35 are connected together by a cross piece 36 which is suitably spaced above the plate 29, said bar or cross piece being connected by links 37 with the cranks 25 of the rock shaft 24. It follows that by rocking the shaft 24 by means of the lever 26 the digger element may be raised from or lowered to ground engaging position. It will be more-over particularly noted that the plate 29 of the digger element is disposed in an inclined position, being downwardly and forwardly inclined so that when the teeth are in ground engaging position, the rearward ends of said teeth will be materially elevated above the ground.

The cleaning element of the improved machine consists of a mat 38 which is composed of a large number of links or rings, circular or otherwise, said links or rings being connected together to form a flexible fabric. The links may be formed of iron rods of three-sixteenths of an inch diameter, the diameter of the individual links being one and a half inches, more or less, it being understood that the dimensions of the links, as well as the material of which they are constructed, may be varied. The mat should be of a width corresponding to that of the plate 29 and it may be of any desired length, say from four to ten feet, according to the nature of the soil where the machine is used, it being obvious that in loose sandy soil the cleaning operation will be successfully performed by a mat that is much shorter than that required where the soil is stiff and sticky.

For the purpose of connecting the mat with the plate 29, we provide a rod or bar 39 which is disposed mainly below the rearward end of the teeth 33, said rod being, however, provided with upturned portions that extend upwardly above the teeth at the two ends of the plate and outwardly beyond said teeth, said rod being provided with terminal eyes 40. That portion of the rod which extends beneath the intermediate teeth is provided with corrugations 41. The rod 39 is secured in position by providing the two end teeth of the digger with upturned portions or lugs 42 lying in the path of the rod. The mat is connected with the rod by engaging the forward links of the mat with the eyes 40 and the corrugations 41 of the rod so that the mat, in operation, will drag behind the digger. It will be obvious that, owing to the inclined position of the digger plate 29, the forward end portion of the mat will be slightly elevated from the ground when the machine is in operation.

In the operation of this device the machine is drawn over the ground in engagement with the ridge or hill of potatoes, the teeth of the diggers penetrating into the soil and lifting and excavating the potatoes which will ride upwardly over the inclined plate, being discharged over the upper rearward ends of the teeth upon the mat 38 which, being drawn in a forward direction and constantly agitated by contact with the soil, will cleanse the potatoes from adhering dirt and leave the potatoes exposed on the ground convenient for subsequent gathering. It will be noticed that the mat consists of a continuous flexible fabric which is clearly distinguished from disconnected chains such as have been previously used in devices of this class which have been open to the objection that they would spread apart and leave the potatoes exposed on the ground without properly cleaning the same, while by this device the cleaning operation will be thoroughly performed.

Having thus described the invention, what is claimed as new is:

1. In a potato digger, a digging member consisting of an inclined plate having lengthwise disposed teeth extending forwardly and rearwardly thereof, in combination with a flexible mat connected with the rearward part of the digging member.

2. In a potato digger, the combination with suitable carrying means, of a digging member consisting of an inclined plate having lengthwise disposed teeth extending forwardly and rearwardly thereof, some of the teeth being provided with upturned lugs at their rearward ends, a corrugated bar having upturned portions extending above and beyond the teeth having upturned lugs, said lugs lying in the path of said bar, and a mat composed of a plurality of connected metallic links, said mat being connected with the corrugated bar.

3. In a potato digger, the combination with a digging element supported in an inclined position and comprising a plate and a series of teeth connected therewith, of a cleaning device consisting of a flexible mat composed of a large number of links loosely joined together, said mat being connected with the elevated rearward portion of the digging element.

In testimony whereof we affix our signatures.

FRANK F. ALEXANDER.
LOUIS W. BRUUN.